March 6, 1951     P. E. PURCELL     2,544,613
VENT PLUG FOR OIL DRUMS
Filed Jan. 9, 1946

INVENTOR
P. E. PURCELL
BY G. B. Birkenbeuel
ATTORNEY.

Patented Mar. 6, 1951

2,544,613

UNITED STATES PATENT OFFICE 2,544,613

VENT PLUG FOR OIL DRUMS

Peter E. Purcell, Portland, Oreg.

Application January 9, 1946, Serial No. 639,971

1 Claim. (Cl. 220—44)

This invention relates generally to the transportation and the storage of oil, and particularly to a vent plug for oil drums.

The main object of this invention is to provide a simple and efficient one piece vent plug for oil drums which will not become lost and which will in no way interfere with the drawings of oil or prevent the effective sealing of the container when closed.

The second object is to provide a screen for the vent opening.

I accomplish these and other objects in a manner set forth in the following specification as illustrated in the accompanying drawing, in which Fig. 1 is a fragmentary view through the top of an oil drum showing a portion of the device in section along its longitudinal axis with the plug in a closed position.

Similar numbers refer to similar parts throughout the several views.

Figure 2:
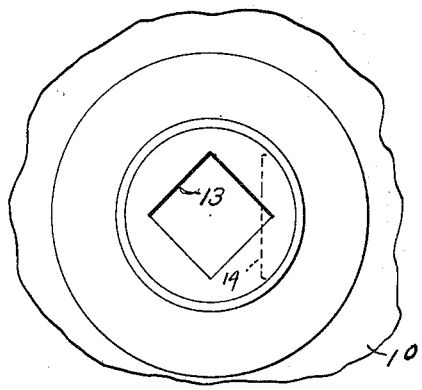
Fig. 2 is a plan of Fig. 1.
Figure 1:
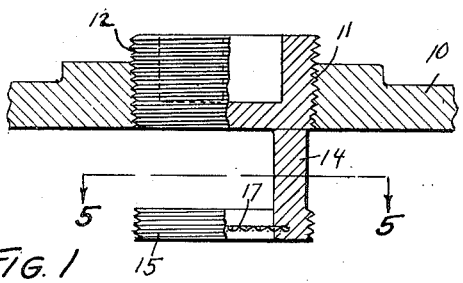

There is shown in the drawing an oil drum 10 having the usual filler opening 11 in the form of a threaded hole in a reinforced portion of the drum top.

Referring particularly to my invention, same will be seen to consist of a threaded plug 12 having the usual recess 13 formed therein for a wrench. The threads of the plug 12 are made to fit the opening 11.

Extending from the plug 12 is a stem 14 on the end of which is disposed a threaded ring 15, whose external diameter is substantially equal to the smallest diameter of the tapered plug 12. The length of the stem 14 depends upon the thickness of the member 10, around the opening 11, and its purpose is to permit the plug 12 to be completely unscrewed before the threaded portion 15 reaches the inner end of the opening 11.

Figure 3:
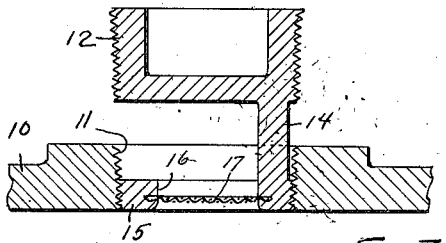
Fig. 3 is a view similar to Fig. 1 but showing the plug in air venting position.
Figure 5:
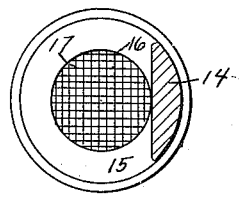
Fig. 5 is a section taken along the line 5—5 in Fig. 1.

It is desirable to provide the ring 15 with an opening 16 which is covered by a screen 17 to prevent material from falling into the drum when in the position shown in Fig. 3; that is, when oil is being withdrawn from the drum while it is standing in its normal upright position.

Figure 4:
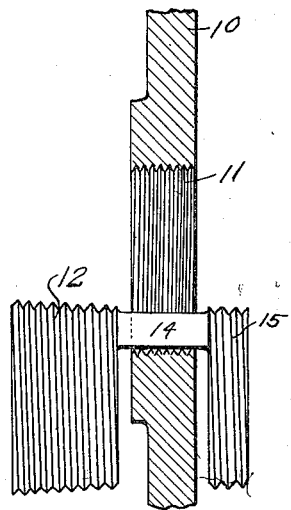
Fig. 4 is a view showing the position of the plug when pouring oil out of the vent opening.
Figure 6:
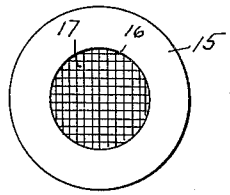
Fig. 6 is a bottom view of Fig. 1.

It will be noted in Fig. 4 that the stem 14, being on one side of the device, permits the members 12 and 15 to drop away from the main opening 11, making it possible to pour out of this opening should it be so desired.

It will be seen from the foregoing that this simple one-piece structure will make it impossible to accidentally lose the plug and at the same time, will hold it in constant readiness for the insertion.

While I have thus illustrated and described my invention, it is not my desire to be limited to the precise form shown herein, and I intend to cover such forms and modifications of the invention as fall fairly within the appended claim.

I claim:

A plug for oil drums consisting of a tapering threaded plug having a wrench recess at one end thereof, and an integral stem formed on one side of the opposite end thereof, said stem having formed integral therewith a threaded ring equalling in diameter the smaller end of the tapering threaded plug and concentric therewith and spaced therefrom, said threaded ring having a screen therein.

PETER E. PURCELL.

REFERENCES CITED

The following references are of record in the file of this patent:

UNITED STATES PATENTS

| Number | Name | Date |
|---|---|---|
| 242,962 | Newton | June 14, 1881 |
| 750,089 | Childs | Jan. 19, 1904 |
| 1,272,229 | Daly | July 9, 1918 |
| 1,654,501 | Jensen | Dec. 27, 1927 |
| 1,841,727 | Glowacki | Jan. 19, 1932 |
| 1,846,400 | Macfarlane | Feb. 23, 1932 |
| 1,985,582 | Schwinger | Dec. 25, 1934 |
| 2,035,055 | Dyer | Mar. 24, 1936 |